United States Patent [19]

Buhart

[11] Patent Number: 4,509,152
[45] Date of Patent: Apr. 2, 1985

[54] CHANNEL FORMATION SYSTEM FOR PANORAMIC SONARS

[75] Inventor: André Buhart, Paris, France

[73] Assignee: Thomson-CSF, Paris, France

[21] Appl. No.: 406,001

[22] Filed: Aug. 6, 1982

[30] Foreign Application Priority Data

Aug. 7, 1981 [FR] France .................. 81 15363

[51] Int. Cl.³ ................. G01S 7/52; G01S 15/02
[52] U.S. Cl. ......................... 367/123; 367/105
[58] Field of Search ............................. 367/123, 105

[56] References Cited

U.S. PATENT DOCUMENTS

| | | | |
|---|---|---|---|
| 4,003,016 | 1/1977 | Remley | 367/123 |
| 4,253,168 | 2/1981 | Petrosky et al. | 367/123 |
| 4,301,522 | 11/1981 | Guyot et al. | 367/123 |
| 4,336,607 | 6/1982 | Hill et al. | 367/123 |

FOREIGN PATENT DOCUMENTS

0007864 2/1980 European Pat. Off. .
2013446 8/1979 United Kingdom .

*Primary Examiner*—Richard A. Farley
*Attorney, Agent, or Firm*—Oblon, Fisher, Spivak, McClelland & Maier

[57] ABSTRACT

In a panoramic sonar for underwater detection, a channel formation device supplies channels sequentially over 360° from a circular base of N receiving transducers, one channel being formed from M transducers. The signals received by the N transducers are multiplexed and applied to two subassemblies. One subassembly is composed of shift registers corresponding to N and N−1 cells ($C_N$, $C_{N-1}$) and the other subassembly is composed of shift registers corresponding to N and N+1 cells ($C_N$, $C_{N+1}$). Taps on the subassemblies make it possible to obtain the delayed signals corresponding to the M receiving transducers. The signals are summated and applied sequentially to the channels.

3 Claims, 12 Drawing Figures

$C_R$ MODULE CCD OF R CELLS
R = ℓ, N, N−1, N+1

CHANNEL FORMATION SYSTEM FOR PANORAMIC SONARS

This invention relates to the beam formation or channels of a panoramic sonar equipped with a circular listening base. The formation of channels is obtained by means of a technique involving the use of charge-coupled devices designated by the abbreviation CCD.

A preformed channel corresponds to reception of sound signals about a given direction. The channel is obtained by compensation of relative time delays of electric signals with respect to said direction, the signals being delivered by the transducers which form the listening base. Said time delays are obtained by means of delay lines and in particular by CCD analog shift registers or digital shift registers.

The advantage arising from the use of CCDs in comparison with digital devices is due to the fact that, in the case of CCDs, the signals are processed in the form of analog samples. This results in simplification of equipment since provision has to be made in digital systems for a number of shift registers corresponding to the number of bits resulting from quantization of amplitudes. Furthermore, the CCD technique makes it possible to dispense with analog-to-digital and digital-to-analog converters which are costly devices and reduce the signal-to-noise ratio.

In this CCD channel formation technique, the signals received by the different transducers which form the listening base can be processed in parallel. This has the disadvantage of requiring a number of CCD shift registers corresponding to the number of transducers. It is therefore more advantageous to process these signals in series by multiplexing.

For the purpose of processing signals in series in accordance with the prior art, the time delays are obtained by means of tapping connections on the CCD shift register which receives the multiplexed signals. These tapping connections (hereinafter designated as taps) deliver sampled signals corresponding to transducers which are all different, said taps being so arranged as to provide the time delays required for the formation of the channels.

The channels are formed by addition of the delayed signals and obtained sequentially when the samples advance within the CCD shift register.

One example of formation of channels by the CCD technology is given in European patent Application No. 007 864 published on Feb. 6th, 1980.

In this patent Application, a certain number of channels are obtained by interpolation.

In the case of these devices, CCDs have to be fabricated with multiple taps in precise locations which are dependent on the characteristics of the sonar equipment and especially on the diameters of the listening base.

This has the disadvantage of calling for the construction of a special CCD line for each application.

The device according to the invention makes it possible to overcome this disadvantage by making it possible practically to use only the lines comprising modules of $N$, $N-1$ and $N+1$ cells which permit the formation of channels when connected in series, irrespective in particular of the diameter of the listening base.

A further advantage of the device according to the invention is that a fault condition can be remedied by replacement of a module.

In an alternative embodiment of the invention which is primarily concerned with the case of processing of N one-bit multiplexed digital signals, delay lines are formed by a read/write memory in which writing is performed at the addresses supplied by a modulo N, $N-1$ or $N+1$ counter. In the first case, at the end of N bits, the bits previously written are re-written at the same address in another sub-memory. The signals are delivered with a delay of pN, where p is the number of sub-memories.

In brief outline, this device for the formation of channels for panoramic sonars comprises a circular base of N detectors and the N signals received by the detectors are applied to a multiplexing circuit under the control of a clock H having a frequency $F_e$. The multiplexed signals are applied to lines of shift registers and taps on said lines serve to collect the M delayed signals corresponding to the M detectors employed for the formation of a channel. The delayed signals are applied to a summing circuit which supplies the channels sequentially. The distinguishing feature of the device lies in the fact that the delayed signals are obtained by means of two lines of shift registers, one line being composed of modules $C_N$ having N cells and of modules $C_{N-1}$ having $N-1$ cells and the other line being composed of modules $C_N$ having N cells and of modules $C_{N+1}$ having $N+1$ cells.

Other features of the invention will be more apparent upon consideration of the following description and accompanying drawings, wherein.

Figure 1:
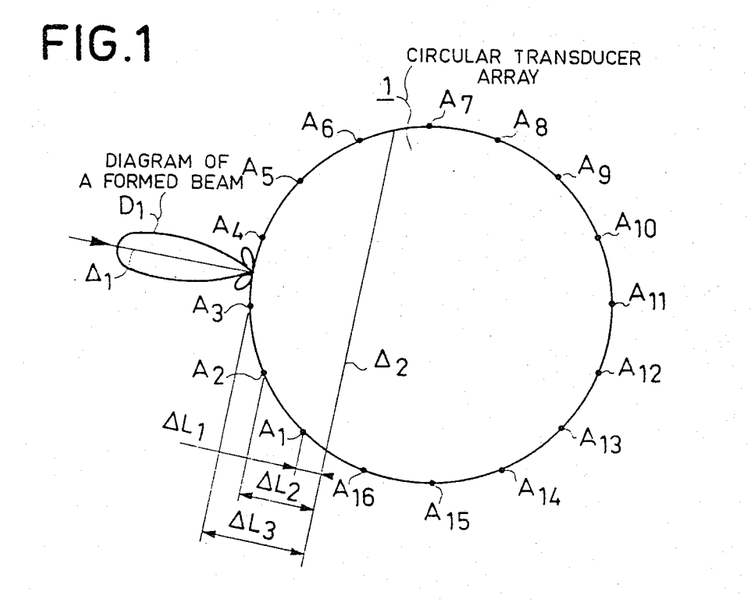
FIG. 1 is a diagram of a circular base showing the path length differences to be compensated in order to form a channel.

FIG. 1 shows a circular base 1 equipped with N transducer detectors $A_1, A_2 \ldots A_N$ (it is postulated in FIG. 1 that N=16). In order to form a channel centered on the direction $\Delta_1$, only the signals received by M tansducers are utilized. In order to form the channel shown in the example of FIG. 1, the following transducers are employed: $A_1, A_2, A_3, A_4, A_5$ and $A_6$ (M=6). Thus in the case of a circular listening base, the transducers located on an arc corresponding to a sector having an angle at the center of 135° take part in the formation of a channel having a diagram $D_1$. It is necessary to compensate for the relative time delays in the case of each transducer. There are shown in the figure the path length differences $\Delta L_1, \Delta L_2, \Delta L_3$ (M being an even number) which are the distances from the transducers $A_1$ and $A_6$, $A_2$ and $A_5$, $A_3$ and $A_4$ to a straight line $\Delta_2$ at right angles to the direction $\Delta_1$. It is simply deduced therefrom that the time delays $\tau_i$ to be introduced in order to bring the signals back on the same virtual wave plane are such that:

$$\tau_i = \Delta L_i / V_c$$

where i is the number of the receiving transducer and $V_c$ is the wave velocity. If $s_i(t)$ is the signal delivered by a receiving transducer, the channel signal is given by:

$$V(t) = \Sigma_i a_i s_i(t - \tau_i).$$

$a_i$: weighting coefficient if applicable.

Figure 2:
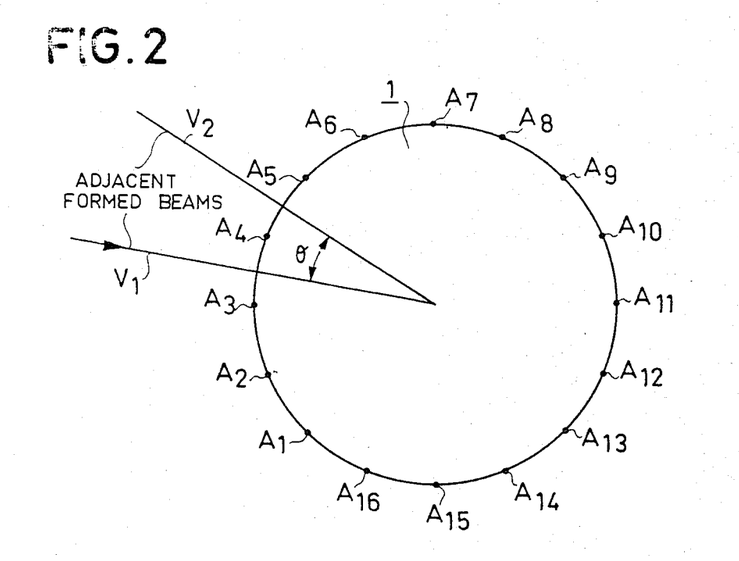
FIG. 2 is a diagram illustrating the change in direction of the channels.

If the signal of a receiving transducer such as $A_i$ is replaced by the signal of the following transducer $A_{i+1}$ on the circle 1 and the previous time delays are retained, another channel $V_2$ is obtained as shown in FIG. 2, in which $V_2$ is shifted with respect to the channel $V_1$ through an angle $\theta$ which corresponds to the angle between two successive receiving transducers.

N channels which are disposed at uniform intervals over 360° are thus formed sequentially.

Figure 3:
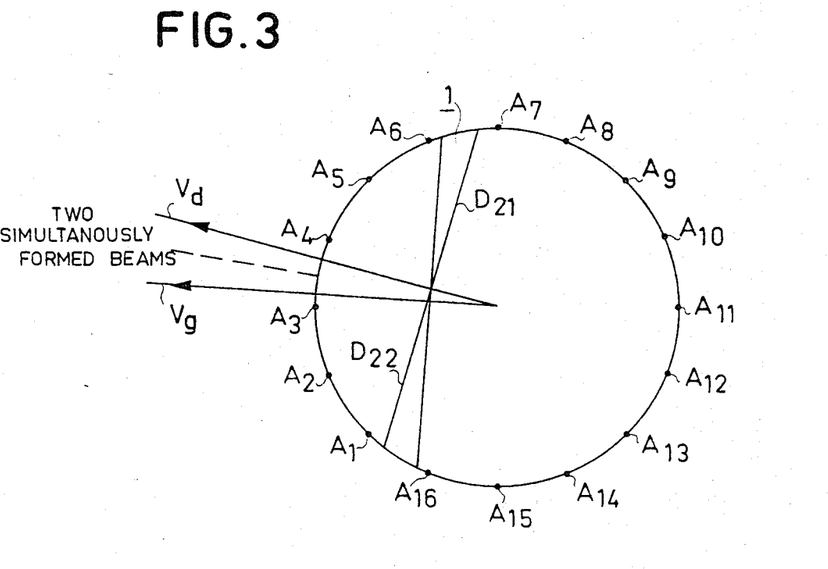
FIG. 3 is a diagram showing the simultaneous formation of two channels.

It is a known practice to form more than N channels over 360°, for example 2N channels as shown in FIG. 3, in which a so-called right-hand channel $V_d$ and a so-called left-hand channel $V_g$ corresponds to each preceding channel. These two channels are obtained by compensating for the time delays of the detectors employed with respect to two wave planes $D_{21}$ and $D_{22}$ which are perpendicular to the directions of the channels $V_d$ and $V_g$.

Figure 4:
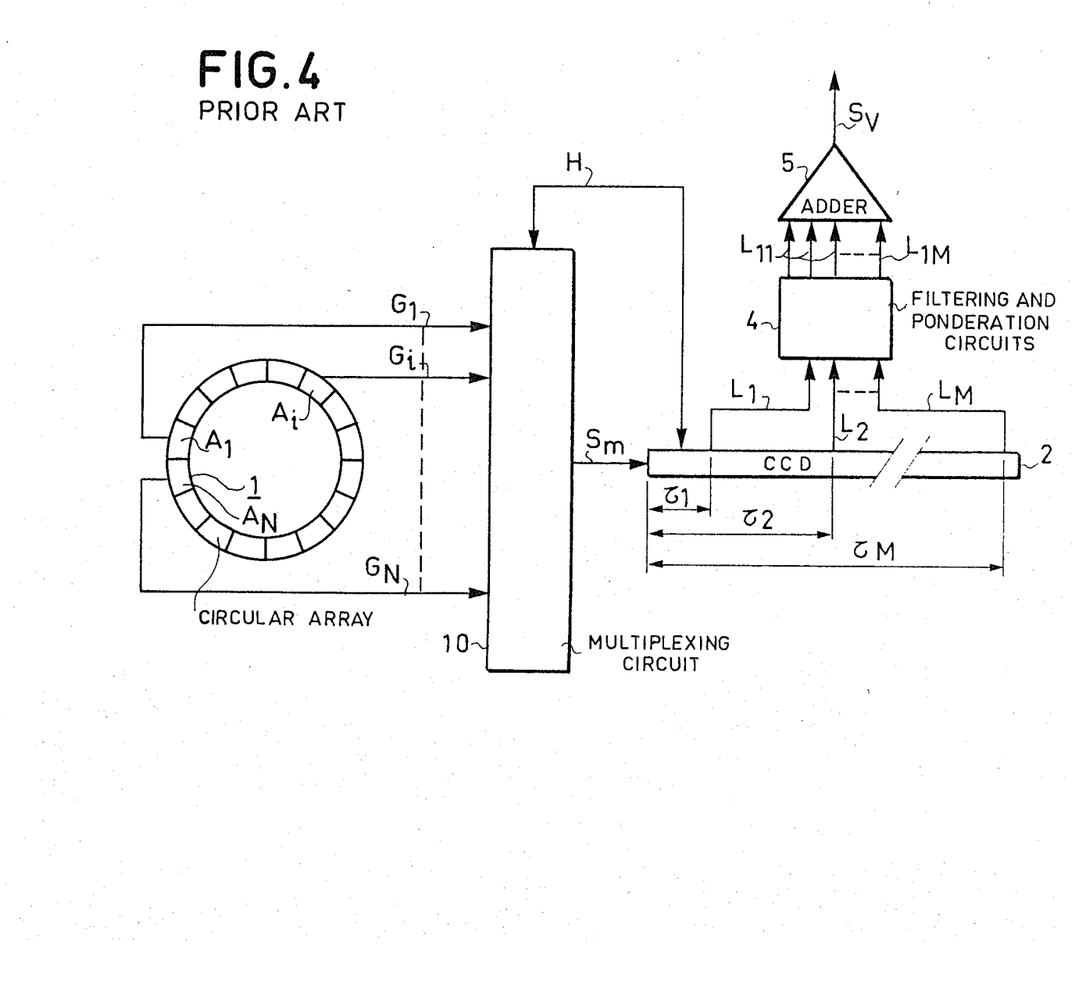
FIG. 4 is a schematic diagram of formation of channels.

FIG. 4 shows the known principle which is adopted in order to obtain sequential channels over 360°.

The signals received by the transducers $A_1 \ldots A_i \ldots A_N$ are applied via output leads $G_1 \ldots G_i \ldots G_N$ to a multiplexing device 10 under the control of a clock H at the frequency $F_e$. The multiplexed signals $S_m$ are applied to the CCD line 2 in which the analog samples advance at the rate $F_e$. Taps are disposed on the line 2 in order to collect the signals delivered by the successive receiving transducers with the time delays $\tau_1, \tau_2 \ldots \tau_M$. The delayed signals are applied to filtering and weighting circuits 4 and are applied at $L_{11}, L_{12} \ldots L_{1M}$ to a summing circuit 5 which delivers the channels $S_v$ in succession at the rate $F_e$.

Figure 5:
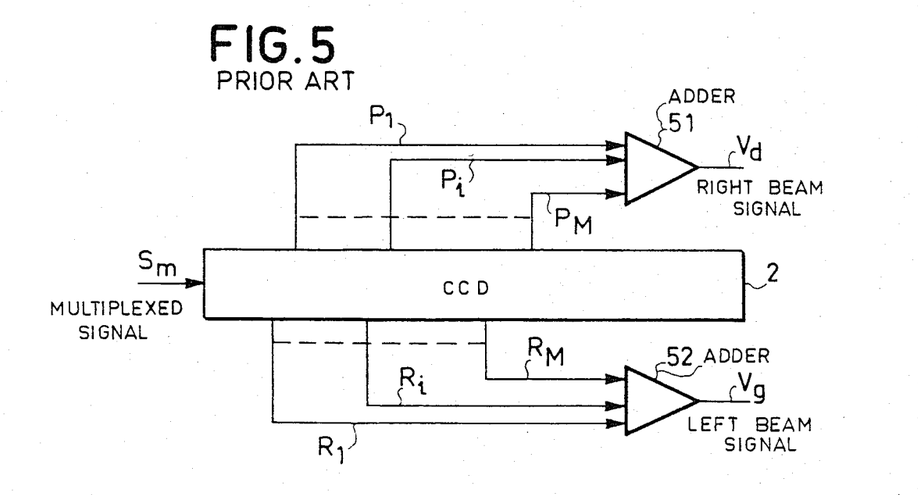
FIG. 5 is a diagram representing a CCD line with taps for the formation of channels.

In order to form 2N channels, the same CCD line (as shown in FIG. 5) can be employed with the taps $P_1 \ldots P_i \ldots P_M$ in the case of the right-hand channel $V_d$ and with the taps $R_1 \ldots R_i \ldots R_M$ in the case of the left-hand channels, the channels $V_d$ and $V_g$ being obtained after summation by the summing circuits 51 and 52.

Figure 6:
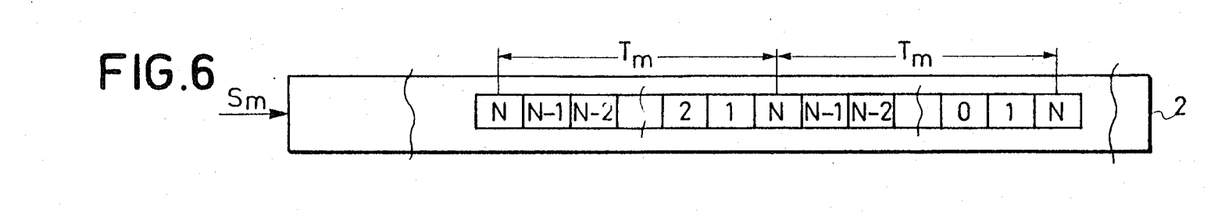
FIGS. 6, 7 and 8 show the distribution of samples of multiplexed signals in the CCD line.

FIG. 6 shows how the successive samples follow each other within the CCD register 2. Series of samples [N], [N−1] ..., [2], [1] follow each other, the transit time of one series being $T_m = N/F_e$.

Figure 7:
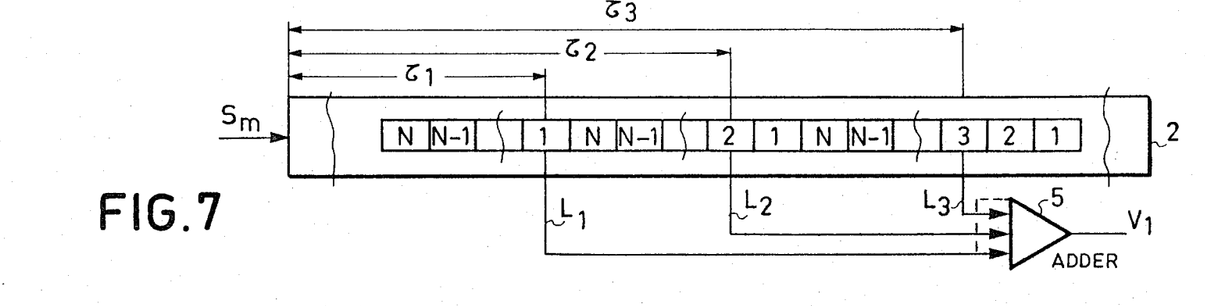

At a given instant $T_o$ as shown in FIG. 7, the sample [1] corresponds to the tap $L_1$, the sample [2] corresponds to the tap $L_2$ and the sample [3] corresponds to the tap $L_3$, and so on. The taps correspond approximately to the time delays which are necessary, namely $\tau_1, \tau_2, \tau_3$ and so on.

Figure 8:
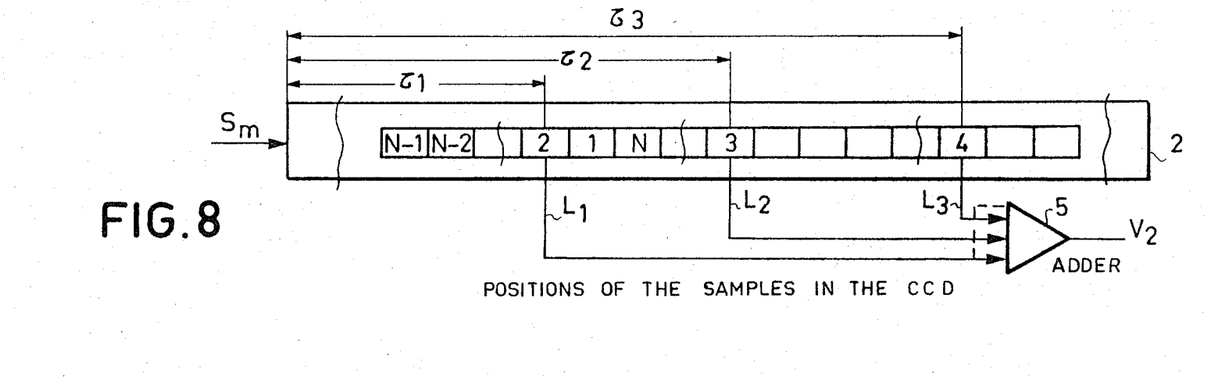

At the instant $T_o + 1/F_e$ as shown in FIG. 8, the samples will have advanced by one storage location, the samples [2], [3] and [4] will correspond to the taps $L_1$, $L_2$, $L_3$ and the channel $V_1$ will be replaced by the channel $V_2$.

Figure 9:
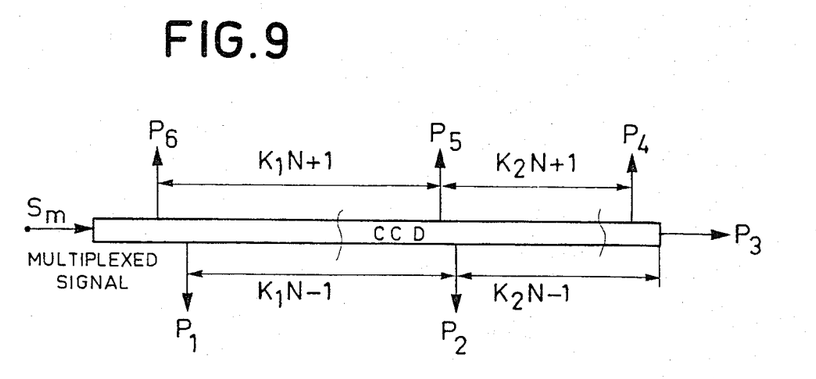
FIG. 9 shows the locations of the taps on the CCD line.

FIG. 9 shows the number of cells of the CCD line between two successive taps in the case of M=6. There are $K_1$ N−1 cells between the taps $P_1$ and $P_2$ and there are $K_2$ N−1 cells between the taps $P_2$ and $P_3$, $K_1$ and $K_2$ being whole numbers which are chosen in order to obtain the necessary time delays. These delays must take into account not only the geometrical delays shown in FIG. 1 but also the delays arising from sampling by the multiplexer 10 of FIG. 4. The time delays increase in the case of the corresponding signals delivered by the receiving transducers $A_1$ to $A_3$. On the other hand, the time delays decrease in the case of the signals delivered by the transducers $A_4$ to $A_6$.

In the case of the taps $P_4$, $P_5$, $P_6$ corresponding to the receiving transducers just mentioned, the number of cells between taps is of the form $K_1 N + 1$ and $K_2 N + 1$.

The tapping-connection device shown in FIG. 9 entails the need for a CCD register of special design for an application which depends on the radius of the base, on the number M of receiving transducers employed and on the wave velocity.

The channel-forming device according to the invention makes it possible to obtain all the time delays which are necessary by means of two lines and, apart from one module, comprises only modules consisting of N, N−1 and N+1 cells.

Figure 10:
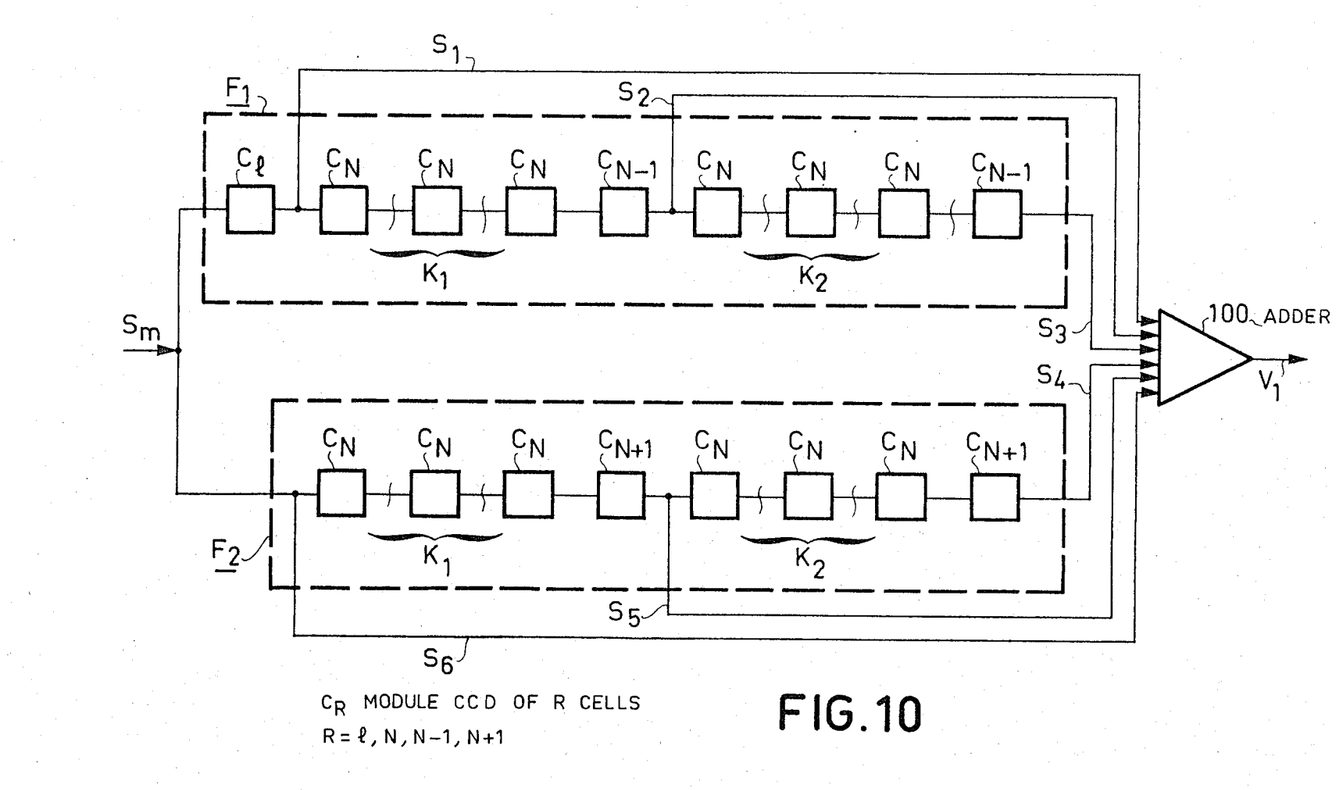
FIG. 10 is a diagram illustrating the construction of the delay lines with taps by making use of modules having N, $N-1$ and $N+1$ cells according to the invention.

FIG. 10 shows the constructional diagram of delay lines in which provision is made for the modules just mentioned (M=6).

The multiplexed signal $S_m$ is applied simultaneously to the subassemblies $F_1$ and $F_2$. The subassembly $F_1$ is provided at the input with one module $C_1$ consisting of one cell, with $K_1$ modules $C_N$ consisting of N cells, followed by one module $C_{N-1}$ consisting of N−1 cells and then followed by $K_2$ modules $C_N$ and one module $C_{N-1}$.

The only non-standard module within the subassembly is the first module which corresponds to compensation for the sampling delay of the receiving transducer $A_6$ with respect to the transducer $A_1$.

The subassembly $F_2$ is composed of $K_1$ modules $C_N$ followed by a module $C_{N+1}$ and of $K_2$ modules $C_N$ followed by a module $C_{N+1}$.

The delayed signals $S_1$, $S_2$ and $S_3$ collected within the subassembly $F_1$ and the signals $S_4$, $S_5$ and $S_6$ collected within the subassembly $F_2$ are added within the summing circuit 100 which delivers the channels such as $V_1$ sequentially.

In one embodiment, the following values are adopted:
Radius of the base: R=1.5 m
Wave velocity: $V_c$=1500 m/sec
No quantization of time delays: $1/F_3 = 0.5$ μsec
Number of receiving transducers: N=32
Number of channels: 2N=64
Number of receiving transducers per channel: M=12.

Figure 11:
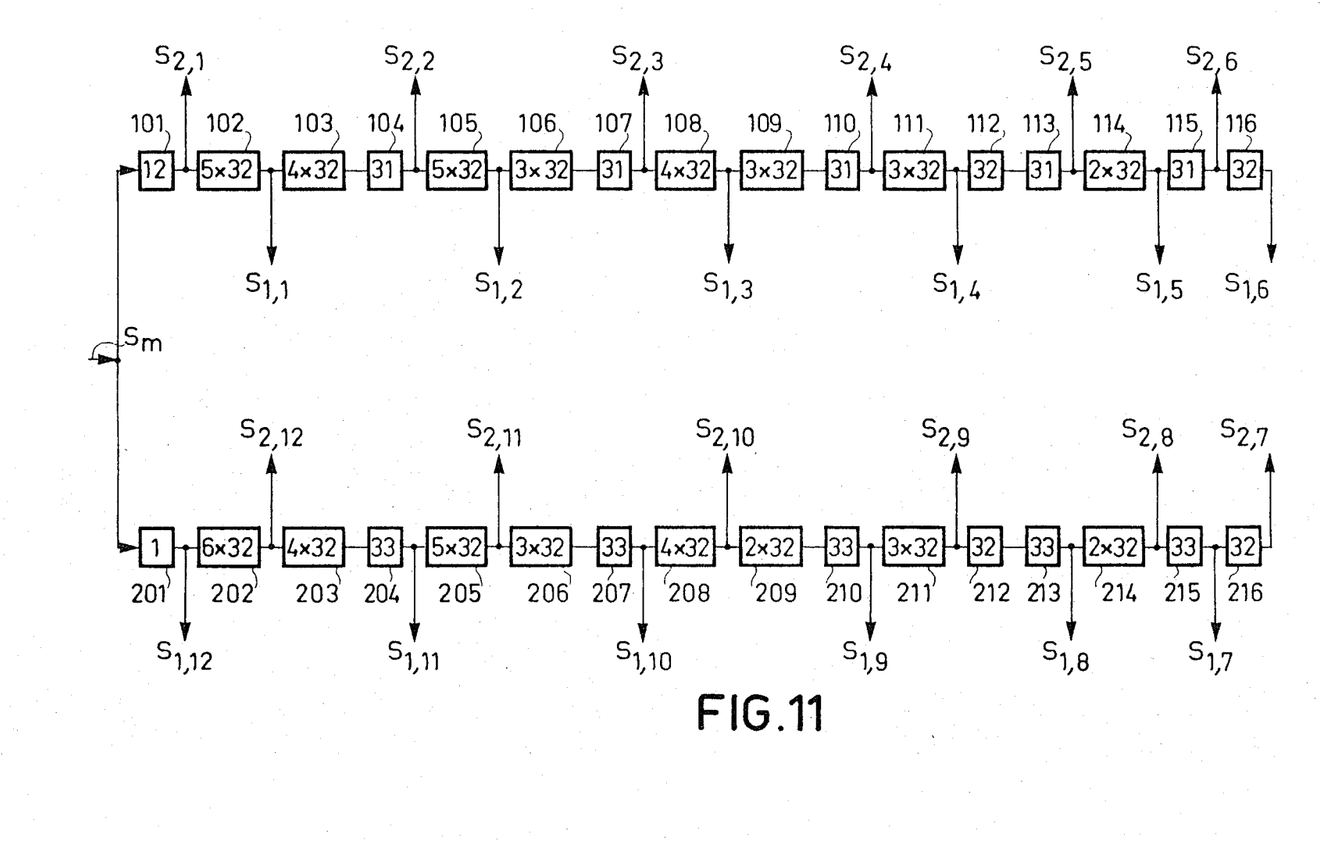
FIG. 11 is a diagram for the construction of a digital delay line according to the invention.

The arrangement adopted for forming the sixty-four channels is shown in FIG. 11. The signal $S_m$ is applied to two lines, one line being shown at the top of the figure and the other line being shown at the bottom of the figure. The composition of the elements of the top line is given in Table I and the composition of the bottom line is given in Table II.

The notation $S_{d,i}$, where i is the number of the receiving transducer, corresponds to the tapping connections of the right-hand channel and the notation $S_{g,i}$ corresponds to the tapping connections of the left-hand channel.

In an alternative embodiment of the invention, a digital technique is utilized in order to form the channels. The signals derived from the receiving transducers are digitized and the $K_1$ or $K_2$ modules $C_N$ or the modules $C_{N-1}$ and $C_{N+1}$ of FIG. 10 are replaced by a processing unit shown in FIG. 12.

Figure 12:
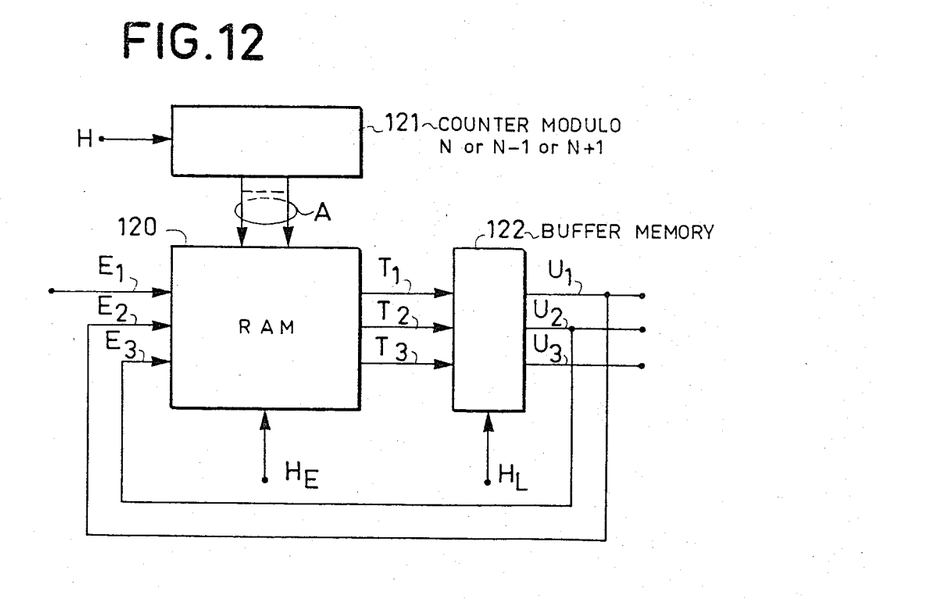
FIG. 12 is a schematic diagram of the time signals for the digital delay lines.

Said unit comprises a counter 121 which is capable of operating in modulo N, N−1 or N+1, an addressable read/write random-access memory (RAM) 120, a buffer memory 122 connected to the output of the memory 120.

The wiring shown in FIG. 12 relates to the construction of three processing modules $C_N$ of FIG. 10 for delaying the output signal by $3N/F_e$ with respect to the input signal. The counter 121 operates in modulo N and delivers the addresses A to the memory 120. Within said memory, the input signal applied at $E_1$ is delayed by N and the resultant signal $T_1$ is temporarily stored in the buffer memory 122. The corresponding output signal $U_1$ is returned into the memory 120 at the input $E_2$, and so on. The output signal $U_3$ is thus delayed by $3N/F_2$ with respect to the input signal.

The memory 120 is read by a clock $H_E$ and the buffer memory is read by a clock $H_L$.

In the case of the modules $C_{N-1}$ and $C_{N+1}$, the counter 121 will operate with a modulo N−1 and N+1.

TABLE I

| Element (FIG. 11) | Composition | Output tap |
|---|---|---|
| 101 | 1 module consisting of 12 cells | $S_{g,1}$ |
| 102 | 5 modules consisting of 32 cells | $S_{d,1}$ |
| 103 | 4 modules consisting of 32 cells | |
| 104 | 1 module consisting of 31 cells | $S_{g,2}$ |
| 105 | 5 modules consisting of 32 cells | $S_{d,2}$ |
| 106 | 3 modules consisting of 32 cells | |
| 107 | 1 module consisting of 31 cells | $S_{g,3}$ |
| 108 | 4 modules consisting of 32 cells | $S_{d,3}$ |
| 109 | 3 modules consisting of 32 cells | |
| 110 | 1 module consisting of 31 cells | $S_{g,4}$ |
| 111 | 3 modules consisting of 32 cells | $S_{d,4}$ |
| 112 | 1 module consisting of 32 cells | |
| 113 | 1 module consisting of 31 cells | $S_{g,5}$ |
| 114 | 2 modules consisting of 32 cells | $S_{d,5}$ |
| 115 | 1 module consisting of 31 cells | $S_{g,6}$ |
| 116 | 1 module consisting of 32 cells | $S_{d,6}$ |

TABLE II

| Element (FIG. 11) | Composition | Output tap |
|---|---|---|
| 201 | 1 cell | $S_{d,12}$ |
| 202 | 6 modules consisting of 32 cells | $S_{g,12}$ |
| 203 | 4 modules consisting of 32 cells | |
| 204 | 1 module consisting of 33 cells | $S_{g,11}$ |
| 205 | 5 modules consisting of 32 cells | $S_{d,11}$ |
| 206 | 3 modules consisting of 32 cells | |
| 207 | 1 module consisting of 33 cells | $S_{d,10}$ |
| 208 | 4 modules consisting of 32 cells | $S_{g,10}$ |
| 209 | 2 modules consisting of 32 cells | |
| 210 | 1 module consisting of 33 cells | $S_{d,9}$ |
| 211 | 3 modules consisting of 32 cells | $S_{g,9}$ |
| 212 | 1 module consisting of 32 cells | |
| 213 | 1 module consisting of 33 cells | $S_{d,8}$ |
| 214 | 2 modules consisting of 32 cells | $S_{g,8}$ |
| 215 | 1 module consisting of 33 cells | $S_{d,7}$ |
| 216 | 1 module consisting of 32 cells | $S_{g,7}$ |

What is claimed is:

1. A device for the formation of channels for panoramic sonar systems comprising:
a circular base of N receiving transducers ($A_1$ $A_2$ ... $A_n$) for receiving N signals
a clock having a set frequency (Fe);
a multiplexing circuit coupled to said transducers for receiving said N signals which is controlled by said clock and for multiplexing said N signals;
shift registers coupled to said multiplexing circuit having lines for receiving said multiplexed signals;
taps provided on said lines of said lines of said shift registers for collecting the N delayed signals corresponding to the N receiving transducers, employed for the formation of a channel and for outputting a resultant signal;
a summing circuit for supplying said channels sequentially wherein the delayed signals are obtained by means of two lines of shift registers, one line of said shift registers being composed of modules $C_N$ having N cells and of modules $C_{N-1}$ having N−1 cells and the other line of said shift registers being composed of modules $C_N$ having N cells and of modules $C_{N+1}$ having N+1 cells.

2. A device according to claim 1 for the formation of channels for a sonar system, wherein said N signals are multiplexed in analog form and wherein said modules are charge-coupled devices.

3. A device according to claim 2 for the formation of channels, wherein taps are disposed after said modules in order to compensate for the time delays corresponding simultaneously to two channels designated respectively as the right-hand channel and the left-hand channel.

* * * * *